United States Patent  
Chou et al.

(10) Patent No.: US 11,814,067 B2
(45) Date of Patent: Nov. 14, 2023

(54) PERIODICALLY MAPPING CALIBRATION SCENE FOR CALIBRATING AUTONOMOUS VEHICLE SENSORS

(71) Applicant: GM Cruise Holdings LLC, San Francisco, CA (US)

(72) Inventors: Daniel Chou, Sunnyvale, CA (US); Nigel Rodrigues, San Francisco, CA (US); Jordan Michael Croom, Los Angeles, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 128 days.

(21) Appl. No.: 17/550,239

(22) Filed: Dec. 14, 2021

(65) Prior Publication Data

US 2023/0182765 A1  Jun. 15, 2023

(51) Int. Cl.
*B60W 60/00* (2020.01)
*G06V 20/56* (2022.01)
*G01C 21/00* (2006.01)
*G06V 40/10* (2022.01)
*B60W 50/00* (2006.01)

(52) U.S. Cl.
CPC ......... *B60W 60/00* (2020.02); *G01C 21/3804* (2020.08); *G01C 21/3885* (2020.08); *G06V 20/56* (2022.01); *G06V 40/10* (2022.01); *B60W 2050/0083* (2013.01); *B60W 2420/00* (2013.01); *B60W 2556/40* (2020.02); *B60W 2556/45* (2020.02)

(58) Field of Classification Search
CPC ............. B60W 60/00; B60W 2556/40; B60W 2556/45; B60W 2050/0083; B60W 2420/00; G01C 21/3804; G01C 21/3885; B06V 40/10; G06V 20/56
See application file for complete search history.

(56) References Cited

U.S. PATENT DOCUMENTS 9,719,801 B1 *  8/2017  Ferguson ............. G01C 21/005
11,460,855 B1 * 10/2022  Lim ..................... G05D 1/0246
11,594,037 B1    2/2023  Grossman et al.
(Continued)

FOREIGN PATENT DOCUMENTS

WO     2017189361 A1    11/2017

*Primary Examiner* — Peter D Nolan
*Assistant Examiner* — Mikko Okechukwu Obioha
(74) *Attorney, Agent, or Firm* — Akona IP

(57) ABSTRACT

A sensor calibration system periodically receives scene data from a detector in a calibration scene. The calibration scene includes calibration targets. The sensor calibration system generates a calibration map based on the scene data. The calibration map is a virtual representation of the calibration scene and includes features of the calibration targets that can be used as ground truth features for calibrating AV sensors. The sensor calibration system can periodically update the calibration map. For instance, the sensor calibration system receives the scene data at a predetermined frequency and updates the calibration map every time it receives new scene data. The predetermined frequency may be a frequency of the detector completing a full scan of the calibration scene. The sensor calibration system provides a latest version of the calibration map for being used by an AV to calibrate a sensor on the AV 110.

20 Claims, 6 Drawing Sheets

(56) References Cited

U.S. PATENT DOCUMENTS

| | | | |
|---|---|---|---|
| 11,623,494 B1* | 4/2023 | Arnicar | B60G 17/019 |
| | | | 701/37 |
| 2017/0132934 A1 | 5/2017 | Kentley et al. | |
| 2017/0248426 A1 | 8/2017 | Jesudason et al. | |
| 2017/0343654 A1 | 11/2017 | Valois et al. | |
| 2018/0299533 A1 | 10/2018 | Pliefke et al. | |
| 2019/0056484 A1 | 2/2019 | Bradley et al. | |
| 2019/0120946 A1* | 4/2019 | Wheeler | G01S 17/89 |
| 2019/0122386 A1* | 4/2019 | Wheeler | G05D 1/0248 |
| 2019/0204427 A1* | 7/2019 | Abari | G01S 17/86 |
| 2020/0200566 A1 | 6/2020 | Kim et al. | |
| 2020/0408887 A1* | 12/2020 | Zeng | G01S 17/87 |
| 2021/0190922 A1* | 6/2021 | Yu | G01S 7/497 |
| 2021/0197854 A1 | 7/2021 | Grabe et al. | |
| 2021/0215505 A1 | 7/2021 | Castorena Martinez et al. | |
| 2021/0239793 A1* | 8/2021 | Yu | G01S 7/4026 |
| 2021/0383517 A1* | 12/2021 | Shen | G06T 3/4038 |
| 2022/0118994 A1* | 4/2022 | Lu | G06T 7/85 |
| 2022/0194412 A1 | 6/2022 | Zhang et al. | |
| 2022/0204019 A1* | 6/2022 | Lauterbach | G06V 20/20 |
| 2022/0244395 A1 | 8/2022 | Chen et al. | |
| 2023/0076693 A1 | 3/2023 | Braun et al. | |
| 2023/0088398 A1 | 3/2023 | Brühlmeier et al. | |

* cited by examiner

US 11,814,067 B2

PERIODICALLY MAPPING CALIBRATION SCENE FOR CALIBRATING AUTONOMOUS VEHICLE SENSORS

TECHNICAL FIELD OF THE DISCLOSURE

The present disclosure relates generally to autonomous vehicles (AVs) and, more specifically, to systems and methods for periodically mapping calibration scenes for calibrating AV sensors.

BACKGROUND

An AV is a vehicle that is capable of sensing and navigating its environment with little or no user input. An autonomous vehicle may sense its environment using sensing devices such as Radio Detection and Ranging (RADAR), Light Detection and Ranging (LIDAR), image sensors, cameras, and the like. An autonomous vehicle system may also use information from a global positioning system (GPS), navigation systems, vehicle-to-vehicle communication, vehicle-to-infrastructure technology, and/or drive-by-wire systems to navigate the vehicle. As used herein, the phrase "autonomous vehicle" includes both fully autonomous and semi-autonomous vehicles.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
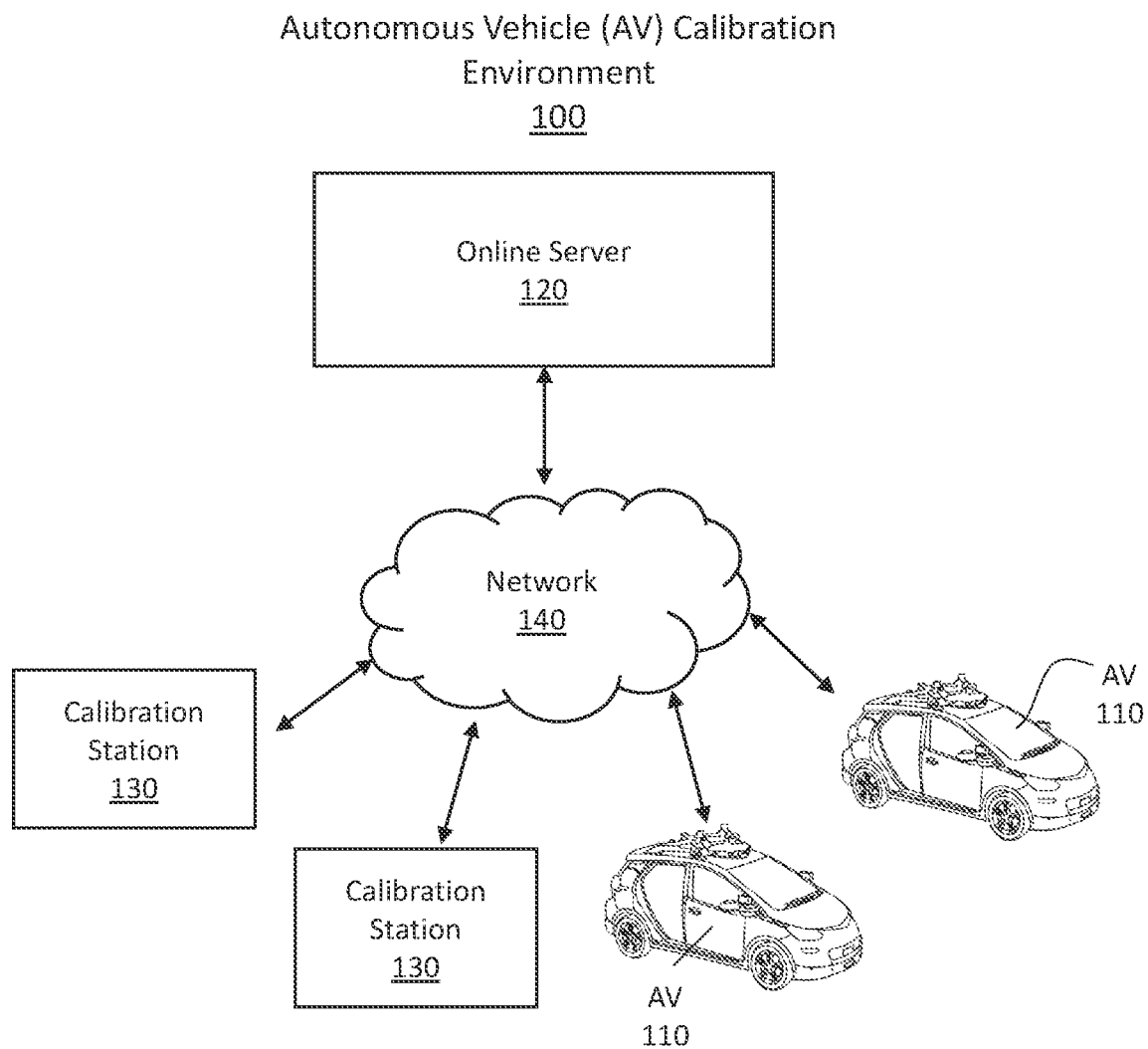
FIG. 1 shows an AV calibration environment according to some embodiments of the present disclosure.

Perception and localization of an AV rely on precise sensor poses (locations or orientations) on the AV and internal sensor parameters. An internal sensor parameter is a parameter used to process data generated by a sensor to detect the environment surrounding the AV. Example internal sensor parameters may include, for example, lens distortion coefficients for imaging sensors, beam angles for LIDAR, etc. Sensor calibration is critical for reliable AV operation on the road. Sensor calibration usually includes an adjustment or set of adjustments performed on internal sensor parameters to make sensors function as accurately, or error free, as possible. Sensor calibration is usually conducted by comparing features of calibration targets detected by a sensor under calibration with ground truth features of the calibration targets. Examples of the ground truth features include poses of calibration targets, edge lines in calibration targets, structures in calibration targets, and so on. Therefore, the accuracy of ground truth labeling is essential to sensor calibration. Ground truth labeling usually requires higher accuracy calibration than on-road operation. The level of accuracy required is much tighter than typical automotive assembly or sensor manufacturing tolerances.

However, it can be difficult to achieve high accuracy in ground truth labeling. For instance, a calibration target in the calibration scene can be inadvertently moved after the pose of the calibration target has been labeled, causing a mismatch between the true pose of the calibration target and the labeled pose of the calibration target. Also, ground truth labeling can be a bottleneck for scaling AV sensor calibration, as accurate measurement of calibrate targets' positions can require a significant amount of time and resources.

A sensor calibration system that periodically maps a calibration scene overcomes these challenges. A calibration scene is an area where one or more calibration targets are located. Each calibration target may be a reference object with defined features for calibration sensors. The sensor calibration system periodically receives information of the calibration scene from a detector that detects the calibration targets in the calibration scene. The detector is a sensor external to the AV for which sensor calibration is needed. Examples of the detector include imaging sensors, laser scanners, temperature sensor, audio sensors, wind sensors, temperature sensors, radiation sensors, etc. The detector may continuously scan the calibration scene to capture information of the calibration scene and sends the information of the calibration scene to the sensor calibration system every time it finishes a full scan of the calibration scene. The information of the calibration scene, also referred to as "scene data," is an output of the detector and includes information of objects, including the calibration targets, detected by the detector in the calibration scene.

Used herein, "periodically" does not necessarily imply that a task/step is performed with a fixed frequency or with a fixed cadence. In some embodiments, periodically can mean that a task/step is performed at a fixed frequency. In some embodiments, periodically can mean that a task/step is performed from time to time and not at a fixed frequency. Periodically can mean regularly, routinely, repeatedly, systematically, occasionally, frequently, as needed, on a schedule, in response to one or more triggers, etc.

The sensor calibration system uses the scene data from the detector to label ground truth features of calibration targets in the calibration scene. The ground truth features of the calibration targets can be, for example, poses (positions or orientations) of the calibration targets in the calibration scene, edge lines in the calibration targets, structures in the calibration targets, and so on. The sensor calibration system generates a calibration map based on the scene data. The calibration map is a virtual representation of the calibration scene and includes the ground truth features of the calibration targets. The sensor calibration system periodically updates the calibration map. For instance, the sensor calibration system generates a new version of the calibration map every time it receives new scene data from the detector.

The sensor calibration system can receive requests for the calibration map from AVs or a third-party system associated with AVs (e.g., a server in the cloud). After receiving such a request, the sensor calibration system sends the latest version of the calibration map to the requesting AV or third-party system. The latest version of the calibration map includes, for example, all the updates that the sensor calibration system has been made to the calibration map by the time the sensor calibration system sends the calibration map to the requesting AV. In some embodiments, the sensor calibration system may receive new scene data from the detector and generates a new version of the calibration map after it sends the calibration map to the requesting AV. In such embodiments, the sensor calibration system can send the new version to the requesting AV. The sensor calibration system may also instruct the AV to disregard any sensor calibration that has been done before the AV receives the new version. By periodically updating the calibration map and providing AVs the latest version of the calibration map, the sensor calibration system can timely capture changes (e.g., intended or inadvertent changes) to the calibration targets and therefore, increase the accuracy of ground truth labeling of the calibration targets.

Moreover, the sensor calibration system can facilitate autonomous calibration of AV sensors. For instance, the sensor calibration system can assign a calibration scene, e.g., from a group of calibration scenes, to an AV and instruct the AV to navigate to the calibration scene. The sensor calibration system may even navigate the AV to a predetermined location in the calibration scene. In one example, the sensor calibration system instructs the AV to navigate to a position where the distance from the AV sensor to the ground of the calibration scene will be the same as the distance from the detector to the ground of the calibration scene. The sensor calibration system can also spin the AV in the calibration scene so that the sensor of the AV can detect calibration targets at different locations in the calibration scene.

In some embodiments, the sensor calibration system may evaluate the calibration scene's readiness for calibrating AV sensor. For instance, the sensor calibration system detects errors in the calibration scene that can interfere with the sensor calibration. An error may be an event, object, or condition that can impair accuracy of the sensor calibration process. Example errors include dislocation of calibration targets, presence of unexpected objects (e.g., a person), improper lighting condition, and so on. In embodiments where the sensor calibration system detects such an error, the sensor calibration system may stop instruct the AV to hold off on starting the sensor calibration process and if the sensor calibration process has started, to stop the calibration process. The sensor calibration system may also instruct the AV to start or resume the sensor calibration process upon a detection that the error has been resolved. In some embodiments, the sensor calibration system may also determine when the AV can leave the calibration scene and instruct the AV to navigate out of the calibration scene. With such an autonomous calibration process, the sensor calibration system can scale AV sensor calibration and manage sensor calibration of a fleet of AVs.

As will be appreciated by one skilled in the art, aspects of the present disclosure, in particular aspects of AV sensor calibration, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing perception system devices or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing or a subset of the elements illustrated in a drawing. Further, some embodiments can incorporate any suitable combination of features from two or more drawings.

Other features and advantages of the disclosure will be apparent from the following description and the claims.

As described herein, one aspect of the present technology may be the gathering and use of data available from various sources to improve quality and experience. The present disclosure contemplates that in some instances, this gathered data may include personal information. The present disclosure contemplates that the entities involved with such personal information respect and value privacy policies and practices.

The following disclosure describes various illustrative embodiments and examples for implementing the features and functionality of the present disclosure. While particular components, arrangements, or features are described below in connection with various example embodiments, these are merely examples used to simplify the present disclosure and are not intended to be limiting.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, or conditions, the phrase "between X and Y" represents a range that includes X and Y.

In addition, the terms "comprise," "comprising," "include," "including," "have," "having" or any other variation thereof, are intended to cover a non-exclusive inclusion. For example, a method, process, device, or system that comprises a list of elements is not necessarily limited to only those elements but may include other elements not expressly listed or inherent to such method, process, device, or system. Also, the term "or" refers to an inclusive or and not to an exclusive or.

The systems, methods and devices of this disclosure each have several innovative aspects, no single one of which is solely responsible for all of the desirable attributes disclosed herein. Details of one or more implementations of the subject matter described in this Specification are set forth in the description below and the accompanying drawings.

Example AV Calibration Environment

FIG. 1 shows an AV calibration environment 100 according to some embodiments of the present disclosure. The AV calibration environment 100 includes AVs 110, an online server 120, calibration stations 130, and a network 140. In other embodiments, the AV calibration environment 100 may include fewer, more, or different components. For instance, the AV calibration environment 100 may include a different number of AVs 110 or a different number of calibration stations 130. A single AV is referred to herein as AV 110, and multiple AVs are referred to collectively as AVs 110. A single calibration station is referred to herein as calibration station 130, and multiple calibration stations are referred to collectively as calibration stations 130.

An AV 110 is a vehicle that is capable of sensing and navigating its environment with little or no user input. The AV 110 may be a semi-autonomous or fully autonomous vehicle, e.g., a boat, an unmanned aerial vehicle, a driverless car, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle. The AV 110 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 110 may additionally or alternatively include interfaces for control of any other vehicle functions, e.g., windshield wipers, headlights, turn indicators, air conditioning, etc.

In some embodiments, an AV 110 includes an onboard sensor suite. The onboard sensor suite detects surrounding environment of the AV 110 and generates sensor data describing the surround environment. The onboard sensor suite may include various types of sensors. In some embodiments, the onboard sensor suite includes a computer vision ("CV") system, localization sensors, and driving sensors. For example, the onboard sensor suite may include photodetectors, cameras, RADAR, Sound Navigation And Ranging (SONAR), LIDAR, GPS, wheel speed sensors, inertial measurement units (IMUS), accelerometers, microphones, strain gauges, pressure monitors, barometers, thermometers, altimeters, ambient light sensors, etc. The sensors may be located in various positions in and around the AV 110.

The AV 110 also includes an onboard controller. The onboard controller controls operations and functionality of the AV 110. The onboard controller also processes sensor data generated by the onboard sensor suite and/or other data (e.g., data received from the online server 120) to determine the state of the AV 110. Based upon the vehicle state and programmed instructions, the onboard controller modifies or controls behavior of the AV 110. In some embodiments, the onboard controller implements an autonomous driving system (ADS) for controlling the AV 110 and processing sensor data from the onboard sensor suite and/or other sensors in order to determine the state of the AV 110. Based upon the vehicle state and programmed instructions, the onboard controller modifies or controls driving behavior of the AV 110.

The onboard controller also controls calibration of the sensors in the onboard sensor suite. In some embodiments, the onboard controller may determine whether a sensor of the AV 110 needs to be calibrated, e.g., based on calibration history, accuracy, or other characteristics of the sensor. After it determines that the sensor needs calibration, the onboard controller requests for a calibration scene including calibration targets needed for calibrating the sensor. The onboard controller may navigate the AV 110 to the calibration scene to allow the sensor to detect the calibration targets. The onboard controller also processes sensor data generated by the sensor to analyze features of the calibration targets detected by the sensor ("detected features"). The onboard controller may compare the detected features with ground truth features of the calibration targets. The onboard controller can adjust the pose or an internal parameter of the sensor based on the comparison to improve the accuracy of the sensor.

In some embodiments, the onboard controller is a general-purpose computer, but may additionally or alternatively be any suitable computing device. The onboard controller is adapted for I/O communication with other components of the AV 110 (e.g., the onboard sensor suite, etc.) and external systems (e.g., the online server 120). The onboard controller may be connected to the Internet via a wireless connection (e.g., via a cellular data connection). Additionally or alternatively, the onboard controller may be coupled to any number of wireless or wired communication systems. More details about the onboard controller are described below in conjunction with FIG. 4.

An AV 110 may also include a rechargeable battery that powers the AV 110. The battery may be a lithium-ion battery, a lithium polymer battery, a lead-acid battery, a nickel-metal hydride battery, a sodium nickel chloride ("zebra") battery, a lithium-titanate battery, or another type of rechargeable battery. In some embodiments, the AV 110 is a hybrid electric vehicle that also includes an internal combustion engine for powering the AV 110, e.g., when the battery has low charge. In some embodiments, the AV 110 includes multiple batteries, e.g., a first battery used to power vehicle propulsion, and a second battery used to power AV hardware (e.g., the onboard sensor suite and the onboard controller 117). The AV 110 may further include components for charging the battery, e.g., a charge port configured to make an electrical connection between the battery and a charging station.

The calibration stations 130 provide calibration scenes for calibrating AV sensors. A calibration scene is an area where one or more calibration targets are located. A calibration target is a reference object that has features that an AV sensor can detect. Examples of the features include pose of the calibration target, graphical pattern on the calibration target, structure (e.g., corner, reflective surface, etc.) on the calibration target, and so on. A calibration target may have a predetermined location in the calibration scene, such as a location where the AV sensor under calibration can detect the calibration target. In some embodiments, locations of the calibration targets can be adjusted to meet requirements of different sensor calibration processes. For instance, the calibration station 130 includes tracks onto which the calibration targets are removably fixed. The calibration targets can be moved along the tracks, e.g., by using an actuator. A calibration scene may be used for calibration one single type of sensor or multiple types of sensors. The calibration targets in a calibration scene are selected and configured based on the type of sensor that the calibration targets are used to calibration.

A calibration station 130 also includes one or more detectors used for providing ground truth features of the calibration targets. In an example, a detector is a sensor, e.g., an imaging sensor, laser scanner, and so on. The detector can scan part of or the whole calibration scene to capture features of some or all of the calibration targets in the calibration scene. The detector outputs scene data and can send the scene data to another system, such as the online server 120, to generate a map of the calibration scene. The scene data may include a point cloud. Each point in the point group may correspond to a physical point in the calibration scene. The scene data may also include one or more images of the calibration scene. A calibration station 130 may include other components. More details regarding the calibration stations 130 are described below in conjunction with FIG. 5.

The online server 120 manages the AVs 110 and calibration stations 130. For instance, the online server 120 manages calibration of AV sensors. The online server 120 receives scene data from the detectors of the calibration stations 130 and generates maps of the calibration scenes ("calibration map"). A calibration is a virtual representation of the corresponding calibration scene. In some embodiments, the online server 120 periodically receives scene data from detectors in the calibration stations 130 and periodically updates the calibration scenes. In an example, the online server 120 generates a new version of the map of a calibration scene every time the online server 120 receives new scene data of the calibration scene. The online server 120 provides the calibration maps to AV 110s. The AVs 110 can use the calibration maps to identify ground truth features of the calibration targets in the calibration scenes and use the ground truth features to calibrate sensors. By periodically mapping the calibration scenes and providing the latest calibration maps to AVs 110, the online server 120 can eliminate the influence of inadvertent changes to the calibration scenes on the calibration result.

In some embodiments, the online server 120 facilitates an autonomous sensor calibration process. For instance, the online server 120 determines that a sensor on an AV 110 needs calibration based on information of the sensor, e.g., calibration history, performance accuracy, calibration requirement, etc. The online server 120 then assigns a calibration station 130 to the AV 110. The online server 120 may select the calibration station 130 from multiple calibration stations 130 based on various factors, such as availability of the calibration station 130, location of the calibration station 130, calibration targets in the calibration station 130, location of the AV 110, characteristics of the sensor that needs calibration, other factors, or some combination thereof. The online server 120 may monitor the calibration scene to ensure that the calibration scene is ready for calibrating the sensor. The online server 120 may also control the AV 110, e.g., navigation of the AV, during the sensor calibration process. After the sensor calibration is done, the online server 120 may instruct the AV 110 to leave the calibration scene so that the calibration scene can be available for another AV 110 that needs sensor calibration.

The online server 120 may manage a service that provides or uses the AVs 110, e.g., a service for providing rides to users with the AVs 110, or a service that delivers items (e.g., prepared foods, groceries, packages, etc.) using the AVs 110.

The online server 120 may select an AV from a fleet of AVs 110 to perform a particular service or other task, and instruct the selected AV 110 to autonomously drive to a particular location (e.g., a delivery address). The online server 120 also manages maintenance tasks, such as charging and servicing of the AVs 110.

In some embodiments, the online server 120 may also provide the AV 110 (and particularly, onboard controller 145) with system backend functions. The online server 120 may include one or more switches, servers, databases, live advisors, or an automated voice response system (VRS). The online server 120 may include any or all of the aforementioned components, which may be coupled to one another via a wired or wireless local area network (LAN). The online server 120 may receive and transmit data via one or more appropriate devices and network from and to the AV 110, such as by wireless systems, such as 882.11x, GPRS, and the like. A database at the online server 120 can store account information such as subscriber authentication information, vehicle identifiers, profile records, behavioral patterns, and other pertinent subscriber information. The online server 120 may also include a database of roads, routes, locations, etc. permitted for use by AV 110. The online server 120 may communicate with the AV 110 to provide route guidance in response to a request received from the vehicle.

For example, based upon information stored in a mapping system of the online server 120, the online server 120 may determine the conditions of various roads or portions thereof. Autonomous vehicles, such as the AV 110, may, in the course of determining a navigation route, receive instructions from the online server 120 regarding which roads or portions thereof, if any, are appropriate for use under certain circumstances, as described herein. Such instructions may be based in part on information received from the AV 110 or other autonomous vehicles regarding road conditions. Accordingly, online server 120 may receive information regarding the roads/routes generally in real-time from one or more vehicles.

The network 140 supports communications between the AVs 110, online server 120, and calibration stations 130. The network 140 may comprise any combination of local area and/or wide area networks, using both wired and/or wireless communication systems. In one embodiment, the network uses standard communications technologies and/or protocols. For example, the network includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as hypertext markup language (HTML) or extensible markup language (XML). In some embodiments, all or some of the communication links of the network 140 may be encrypted using any suitable technique or techniques.

Example Online System

Figure 2:
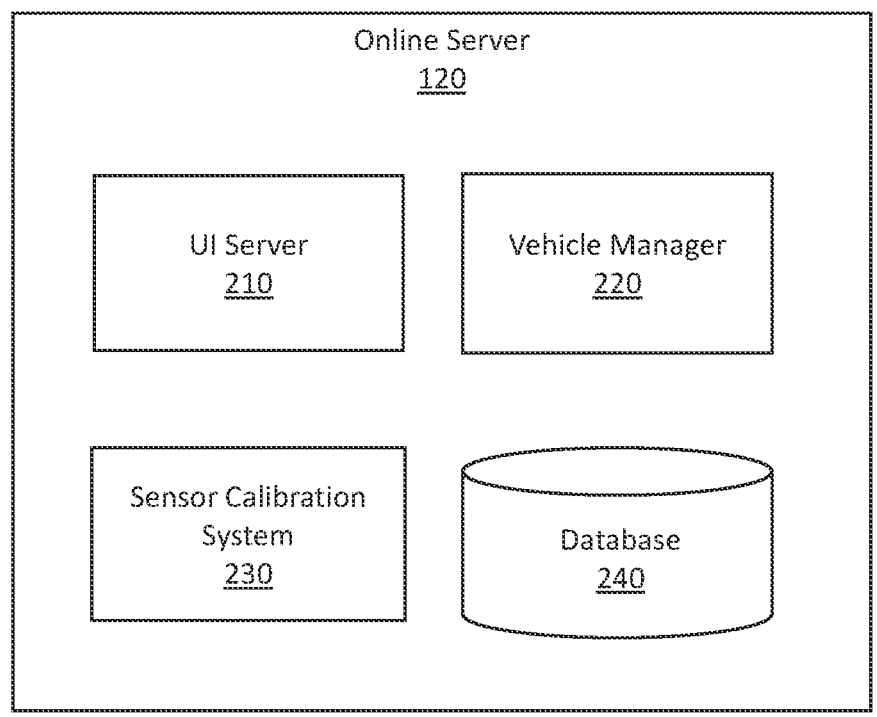
FIG. 2 is a block diagram illustrating an online server according to some embodiments of the present disclosure.

FIG. 2 is a block diagram illustrating the online server 120 according to some embodiments of the present disclosure. The online server 120 includes a user interface (UI) server 210, a vehicle manager 220, a sensor calibration system 230, and a database 240. Alternative configurations, different or additional components may be included in the online server 120. For instance, the sensor calibration system 230 may be a system separate from the online server 120. Further, functionality attributed to one component of the online server 120 may be accomplished by a different component included in the online server 120 or a different system, e.g., the onboard controller of an AV 110.

The UI server 210 is configured to communicate with third-party devices that provide a UI to users. For example, the UI server 210 may be a web server that provides a browser-based application to third-party devices, or the UI server 210 may be a mobile app server that interfaces with a mobile app installed on third-party devices. The UI enables the user to access a service of the online server 120, e.g., to request a delivery by using an AV 110.

The vehicle manager 220 manages and communicates with a fleet of AVs, e.g., the AVs 110. The vehicle manager 220 may assign AVs 110 to various tasks and direct the movements of the AVs 110 in the fleet. For example, the vehicle manager 220 assigns an AV 110 to perform a delivery service requested by a user through the UI server 210. The vehicle manager 220 may instruct AVs 110 to drive to other locations while not servicing a user, e.g., to improve geographic distribution of the fleet, to anticipate demand at particular locations, to drive to a charging station for charging, etc. The vehicle manager 220 also instructs AVs 110 to return to AV facilities for recharging, maintenance, or storage.

The sensor calibration system 230 manages calibration of AV sensors, such as sensors in the onboard sensor suites of AVs 110. The sensor calibration system 230 provides AVs 110 maps of calibration scenes that the AVs 110 can use to obtain ground truth features of calibration targets. The sensor calibration system 230 periodically maps the calibration scenes. In some embodiments, the sensor calibration system 230 periodically receives scene data from a detector in a calibration scene. For instance, the detector continuously scans calibration targets in the calibration scene to capture scene data and sends the scene data to the sensor calibration system 230 every time it finishes a full scan of the calibration scene. The sensor calibration system 230 uses the scene data to generate a calibration map and periodically updates the calibration map. For instance, the sensor calibration system generates a new version and the calibration map every time it receives new screen data from the detector.

The sensor calibration system 230 can receive requests for the calibration map from AVs 110. After receiving such a request, the sensor calibration system 230 sends the latest version of the calibration map to the requesting AV. In some embodiments, the latest version of the calibration map includes all the updates that the sensor calibration system 230 has been made to the calibration map by the time the sensor calibration system 230 sends the calibration map to the requesting AV. In other embodiments, the latest version of the calibration map includes all the updates that the sensor calibration system 230 has been made to the calibration map by a calibration time. The calibration time is a time indicating the start of a sensor calibration process at the calibration scene. For example, the calibration time is a time when the online server 120 receives, from the AV 110, a request for the calibration map or an indication that the sensor calibration process is about to start. In another example, the calibration time is a time when the online server 120 assigns the calibration scene to the AV 110. In yet another example, the calibration time is a time when the online server determines that the AV 110 has arrived at the calibration scene.

In some embodiments, the sensor calibration system 230 may receive new scene data from the detector and generates a new version of the calibration map after it sends the calibration map to the requesting AV. In such embodiments, the sensor calibration system 230 can send the new version to the requesting AV. By periodically updating the calibration map and providing AVs the latest version of the calibration map, the sensor calibration system 230 can timely capture unexpected changes to the calibration targets and therefore, increase the accuracy of ground truth labeling of the calibration targets.

The sensor calibration system 230 may also facilitate autonomous calibration of AV sensors. For instance, the sensor calibration system 230 can instruct an AV under calibration to navigate to the calibration scene, e.g., after the sensor calibration system 230 determines that the calibration scene is available. The sensor calibration system 230 may even navigate the AV to a predetermined location in the calibration scene. In one example, the sensor calibration system 230 instructs the AV 110 to navigate to a position where the distance from the AV sensor to the ground of the calibration scene will be the same as the distance from the detector to the ground of the calibration scene. The sensor calibration system 230 can also spin the AV 110 in the calibration scene, e.g., by turning a turnable station in the calibration scene on which the AV 110 stays during sensor calibration, so that the sensor of the AV can detect calibration targets at different locations in the calibration scene.

In some embodiments, the sensor calibration system 230 may pause a sensor calibration process given an error detected in the calibration scene and resume the sensor calibration process after the error is resolved. The sensor calibration system 230 may detect completion of the sensor's detection of the calibration scene, e.g., by using the detector, and instruct the AV to leave the calibration scene subsequent to such detection. With such an autonomous calibration process, the sensor calibration system can scale AV sensor calibration and manage sensor calibration of a fleet of AVs.

The sensor calibration system 230 may also manage calibration stations 130. In some embodiments, the sensor calibration system 230 monitors availability of the calibration stations 130. For instance, the sensor calibration system 230 uses a detector in a calibration station 130 to detect whether the calibration station 130 is being occupied by an AV. The sensor calibration system 230 may also determine whether a calibration station 130 is ready for calibrating AV sensors, e.g., by determining whether the calibration targets are at the right locations in the calibration station 130, determining whether there is any object or event that would interfere with calibrating the AV sensors, etc. In some embodiments, the sensor calibration system 230 can control the calibration targets in a calibration station 130. For example, the sensor calibration system 230 determines a location for a calibration target based on requirements of the sensor calibration process and moves the calibration target to the determined location. The sensor calibration system 230 may also control scans of the detector. Additionally or alternatively, the sensor calibration system 230 may control other objects or condition in the calibration station 130. For example, the sensor calibration system 230 may control lights in the calibration station 130 to adjust a brightness level of the calibration station 130. More details about the sensor calibration system 230 are described below in conjunction with FIG. 4.

The database 250 stores data used, generated, received, or otherwise associated with the online server 120. For example, the database 250 stores scene data received by the online server 120 from detectors of calibration scenes. As another example, the database 250 stores calibration maps generated by the online server 120. The database 250 may store other information associated with AV sensor calibration, such as sensor calibration history, sensor calibration results, and so on.

Example Sensor Calibration System

Figure 3:
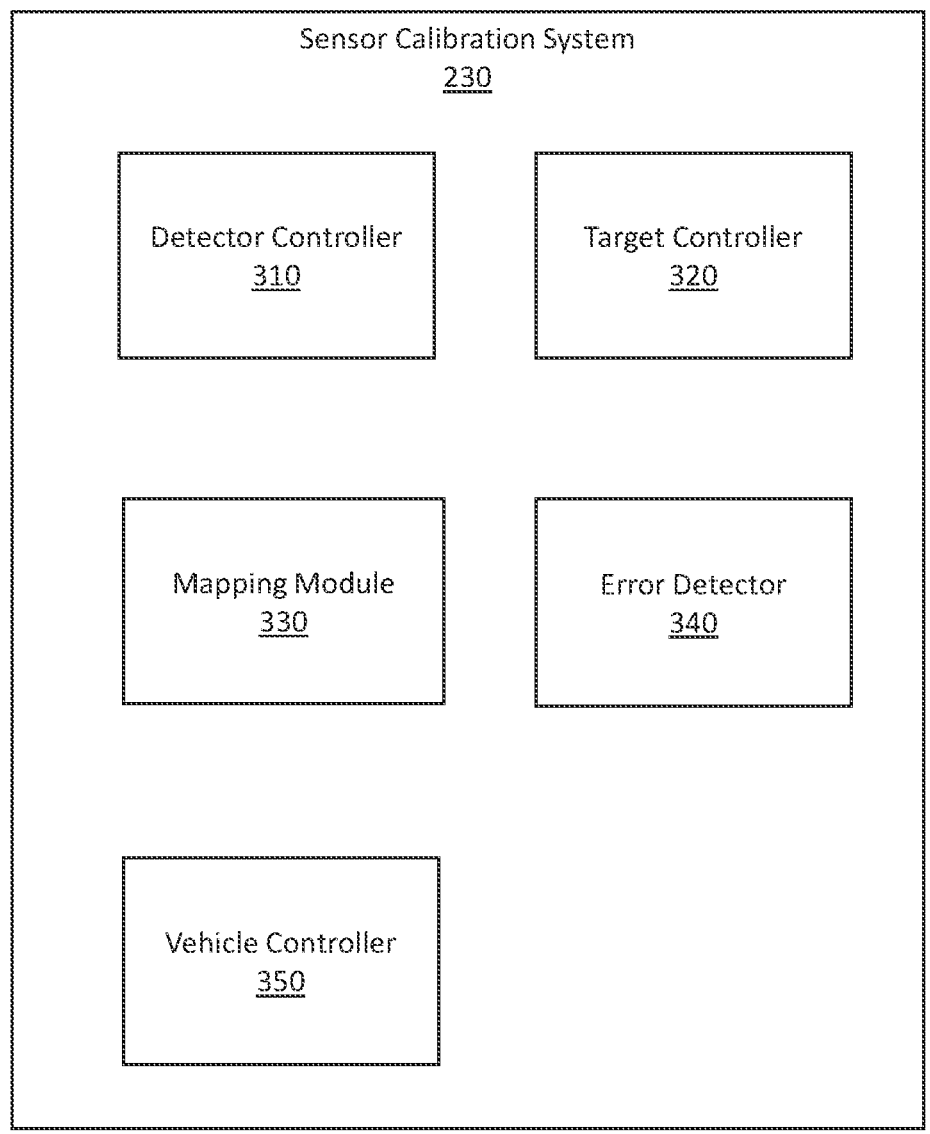
FIG. 3 is a block diagram illustrating a sensor calibration system according to some embodiments of the present disclosure.

FIG. 3 is a block diagram illustrating the sensor calibration system 230 according to some embodiments of the present disclosure. The sensor calibration system 230 includes a detector controller 310, a target controller 320, a mapping module 330, an error detector 340, and a vehicle controller 350. Alternative configurations, different or additional components may be included in the sensor calibration system 230. For instance, some embodiments of the sensor calibration system 230 do not include the detector controller 310 or target controller 320. Further, functionality attributed to one component of the sensor calibration system 230 may be accomplished by a different component (e.g., the onboard controller 300) included in the online server 120 or a different system, e.g., AVs 110.

The detector controller 310 controls detectors in calibration scenes. In some embodiments, the detector controller 310 instructs a detector in a calibration scene to scan the calibration scene at a predetermined frequency, which can be the frequency the mapping module 330 updates the map of the calibration scene. The detector controller 310 may also instruct the detector to scan a portion of or the whole calibration scene. In an example, the detector controller 310 may determine locations of calibration targets in the calibration scene and instruct the detector to scan a part of the calibration scene that includes all the locations of the calibration targets. In another example, the detector controller 310 may instruct the detector to scan the whole calibration scene despite the locations of the calibration targets.

The target controller 320 controls calibration targets in calibration scenes. The target controller 320 may control the position of a calibration target in a calibration scene. In an embodiment, the target controller 320 may move the calibration target to a position required for calibrating a sensor by using an actuator associated with the calibration target. For instance, the actuator may move the calibration target along a track. The target controller 320 can determine whether a calibration target is at the required position based on scene data from the detector or sensor data from a sensor in an AV, e.g., a sensor that does not need calibration at the time the sensor data was generated. The target controller 320 may also control which calibration targets will be used for a sensor calibration process. For example, the target controller 320 selects calibration targets that will be needed in the sensor calibration process. The target controller 320 may expose the features of the needed calibration targets during the sensor calibration process but hide the features of other calibration targets.

The mapping module 330 periodically receives scene data from detectors and periodically mapping calibration scenes based on the received scene data. The mapping module 330 may map a calibration scene at a predetermined frequency, e.g., a frequency that the detector in the calibration scene finishes a full scan of the calibration scene. In some embodiments, the mapping module 330 generates a calibration map and updates the calibration map every time it receives a set of new scene data from the detector. The calibration map is a virtual representation of the calibration scene and includes ground truth features of the calibration targets in the calibration scene. The calibration map may also show other objects in the calibration scene.

The error detector 340 detects errors in calibration scenes that can interfere with AV sensor calibration processes. The error detector 340 may detects the conditions based on sensor data from detectors in the calibration scenes. An error may be an event, object, or condition that can impair accuracy of the sensor calibration process. Example errors include dislocation of calibration targets, presence of unexpected objects (e.g., a person), improper lighting condition, and so on. In embodiments where the error detector 340 detects an error, the error detector 340 can prevent the sensor calibration process from starting or stop the sensor calibration process if the sensor calibration process has started.

In some embodiments, the error detector 340 detects whether there is a foreign object in a calibration scene. A foreign object is an object that is not used in the sensor calibration process, such as a person or other types of objects that may cause personnel concerns or interference with the sensor calibration process. The error detector 340 can instruct the AV 110 under calibration to stop the calibration process upon detection of the foreign object. The error detector 340 may also detecting other conditions in a calibration scene, such as lighting condition. For instance, the error detector 340 may measure a brightness level in the calibration scene and determine whether the brightness level is proper for the sensor calibration. Subsequent to a determination that the brightness level is improper, the error detector 340 may automatically adjust the brightness level to meet the need of the sensor calibration or send out a message to a user to inform the user the improper brightness level in the calibration scene.

After the error detector 340 detects an error, the error detector 340 may also determine whether the error has been resolved. For instance, the error detector 340 determines whether the person who was present in the calibration scene has left, whether the brightness level of the calibration scene has been adjusted to a proper level, etc. After the error detector 340 determines that the error has been resolved, the error detector 340 may allow the sensor calibration process to start or resume.

The vehicle controller 350 controls AVs 110 that need sensor calibration. The vehicle controller 350 may control the navigation of an AV 110 in need of sensor calibration. For instance, the vehicle controller 350 instructs the AV 110 to navigate to a calibration scene, or even a particular spot within the calibration scene (e.g., a turnable station in the calibration scene). The vehicle controller 350 may also control navigation of the AV 110 during the sensor calibration process. In an embodiment, the vehicle controller 350 instructs the AV 110 to spin and can specify the spinning speed of the AV 110. The vehicle controller 350 may also specify a spinning angle of the AV 110 (e.g., 360° for spinning around the calibration scene once, or other angles) to make sure the sensor under calibration detects all the necessary calibration targets. The vehicle controller 350 may monitor the AV 110 during the sensor calibration process. In some embodiments, after the sensor calibration process is completed, the vehicle controller 350 instructs the AV 110 to navigate out of the calibration scene.

Example Onboard Controller

Figure 4:
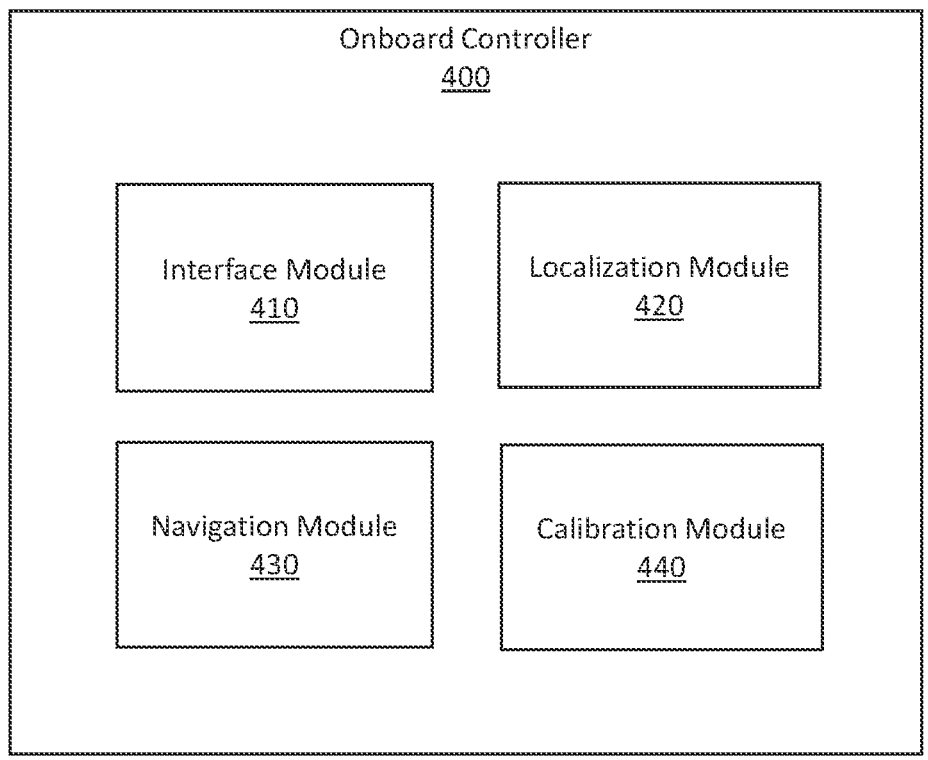
FIG. 4 is a block diagram illustrating an onboard controller of an AV according to some embodiments of the present disclosure.

FIG. 4 is a block diagram illustrating an onboard controller 400 of an AV 110 according to some embodiments of the present disclosure. The onboard controller 400 includes an interface module 410, a localization module 420, a navigation module 430, and a calibration module 440. Alternative configurations, different or additional components may be included in the onboard controller 400. Further, functionality attributed to one component of the onboard controller 400 may be accomplished by a different component included in the AV 110 or a different system, e.g., the online server 120.

The interface module 410 facilitates communications of the onboard controller 400 with other systems. For instance, the interface module 410 supports communications of the onboard controller 400 with other systems, e.g., the online server 120. The interface module 410 supports communications of the onboard controller 400 with other components of the AV 110, e.g., the onboard sensor suite in the AV 110. In an embodiment, the interface module 410 facilitates a local connection between the onboard controller 400 and a calibration station 130. The local connection may be a wired connection or local wireless connection, such as Bluetooth.

The localization module 420 localizes the AV 110. The localization module 420 may use sensor data generated by the onboard sensor suite to determine where the AV 110 is. The sensor data includes information describing an absolute or relative position of the AV 110 (e.g., data generated by GPS, GNSS, IMU, etc.), information describing features surrounding the AV 110 (e.g., data generated by a camera, RADRA, SONAR, LINAR, etc.), information describing motion of the AV 110 (e.g., data generated by the motion sensor), or some combination thereof. In some embodiments, the localization module 420 uses the sensor data to determine whether the AV 110 has entered a local area, such as a calibration scene, a parking lot, and so on. In some other embodiments, the localization module 420 may send the sensor data to the online server 120 and receives from the online server 120 a determination whether the AV 110 has entered the local area.

In some embodiments, the localization module 420 determines whether the AV 110 is at a predetermined location (e.g., a location of a calibration scene). For instance, the localization module 420 uses sensor data generated by the onboard sensor suite (or a sensor in the onboard sensor suite) to determine the location of the AV 110. The localization module 420 may further compare the location of the AV 110 with the predetermined location to determine whether the AV 110 has arrived. In some embodiments, the localization module 420 may provide locations of the AV 110 to the online server 120 for the online server 120 to find a calibration scene for the AV 110.

The localization module 420 can further localize the AV 110 within a local area. For instance, the localization module 420 determines a pose (position or orientation) of the AV 110 in a calibration scene. In some embodiments, the localization module 420 localizes the AV 110 within the local area by using a model of the local area. The model may be a 2D or 4D representation of the surrounding area, such as a map or a 4D virtual scene simulating the surrounding area. For instance, the localization module 420 may use the map of a calibration scene to localize the AV 110 within the calibration scene. In various embodiments, the localization module 420 receives the model of the local area from the online server 120. The localization module 420 may send a request for the model to the online server 120 and in response, receive the model of the local area. In some embodiments, the localization module 420 generates the request based on sensor data indicating a position or motion of the AV 110. For instance, the localization module 420 detects that the AV 110 is in the local area or is navigated to enter the local area based on the sensor data and sends out the request in response to such detection. This process can be dynamic. For example, the localization module 420 may send new request to the online server 120 as the AV 110 changes its position.

The localization module 420 may further localize the AV 110 with respect to an object in the local area. An example of the object is a detector in a calibration scene. The localization module 420 may determine a pose of the AV 110 in relative to the detector based on features of the detector or other objects in the local area. A feature may be two-dimensional or three-dimensional. For example, the localization module 420 retrieves sensor data from one or more sensors (e.g., sensors that do not need calibration) in the onboard sensor suite that detect the features. The localization module 420 uses the sensor data to determine the pose of the AV 110. The localization module 420 may determine whether the pose of the AV 110 is ready for calibrating a sensor. For instance, the localization module 420 determines whether a height of the sensor (i.e., the distance of the sensor from the ground of the calibration scene) is the same as the height of the detector (i.e., the distance of the detector from the ground of the calibration scene).

The navigation module 430 controls motion of the AV 110. The navigation module 430 may control the motor of the AV 110 to start, pause, resume, or stop motion of the AV 110. The navigation module 430 may further control the wheels of the AV 110 to control the direction the AV 110 will move. In various embodiments, the navigation module 430 generates a navigation route for the AV 110 based on a location of the AV 110, a destination, and a map. The navigation module 430 may receive the location of the AV 110 from the localization module 420. The navigation module 430 receives a request to go to a location and generate a route to navigate the AV 110 from its current location, which is determined by the localization module 420, to the destination. The navigation module 430 may receive the destination from the calibration module 440 or an external source, such as the online server 120, through the interface module 410. In one example, the navigation module 430 navigates to a calibration scene based on a request from the calibration module 440 or online server 120. The navigation module 430 may further navigate to a particular spot inside the calibration scene or adjust the pose of the AV 110 in the calibration scene based on the request.

The calibration module 440 calibrates sensors in the onboard sensor suite of the AV 110. In some embodiments, the calibration module 440 may determine whether a sensor of the AV 110 needs to be calibrated. For instance, the calibration module 440 determines whether a sensor needs calibration based on a calibration agenda of the sensor. The calibration agenda may specify a temporal frequency of calibrating the sensor. After the calibration module 440 determines that the sensor needs calibration, the calibration module 440 may send a calibration request to the online server 120. The calibration request includes, for example, information of the sensor (e.g., sensor type, sensor manufacturer, information of the latest calibration, etc.), location of the AV 110, requirements for calibration scene, and so on. In response to the calibration request, the calibration module 440 receives an assignment to a calibration scene. The calibration module 440 may also receive a map of the calibration scene. The calibration module 440 can instruct the navigation module 430 to navigate the AV 110 to the calibration scene, or even to a predetermined spot within the calibration scene. In an embodiment, after the AV 110 reaches the predetermined spot, the calibration module 440 may instruct the navigation module 430 to spin the AV 110 around at the particular spot to allow the sensor to detect calibration targets in the calibration scene.

The calibration module 440 may further process sensor data generated by the sensor to determine features of the calibration targets detected by the sensor. The calibration module 440 may further compare the features of the calibration targets detected by the sensor with corresponding ground truth features of the calibration targets in the calibration map. In some embodiments, the calibration module 440 receives a new version of the calibration map before the calibration process starts (e.g., before the sensor starts to detect the calibration targets) or even during the calibration process (e.g., in the middle of the sensor detecting the calibration targets). The calibration module 440 can adjust internal parameters of the sensor based on the comparison. Additionally or alternatively, the calibration module 440 may adjust the algorithm used to process the sensor data based on the comparison. In some embodiments, the calibration module 440 may also adjust a pose of the sensor with respect to the AV 110 based on the comparison.

Example Calibration Scene

Figure 5:
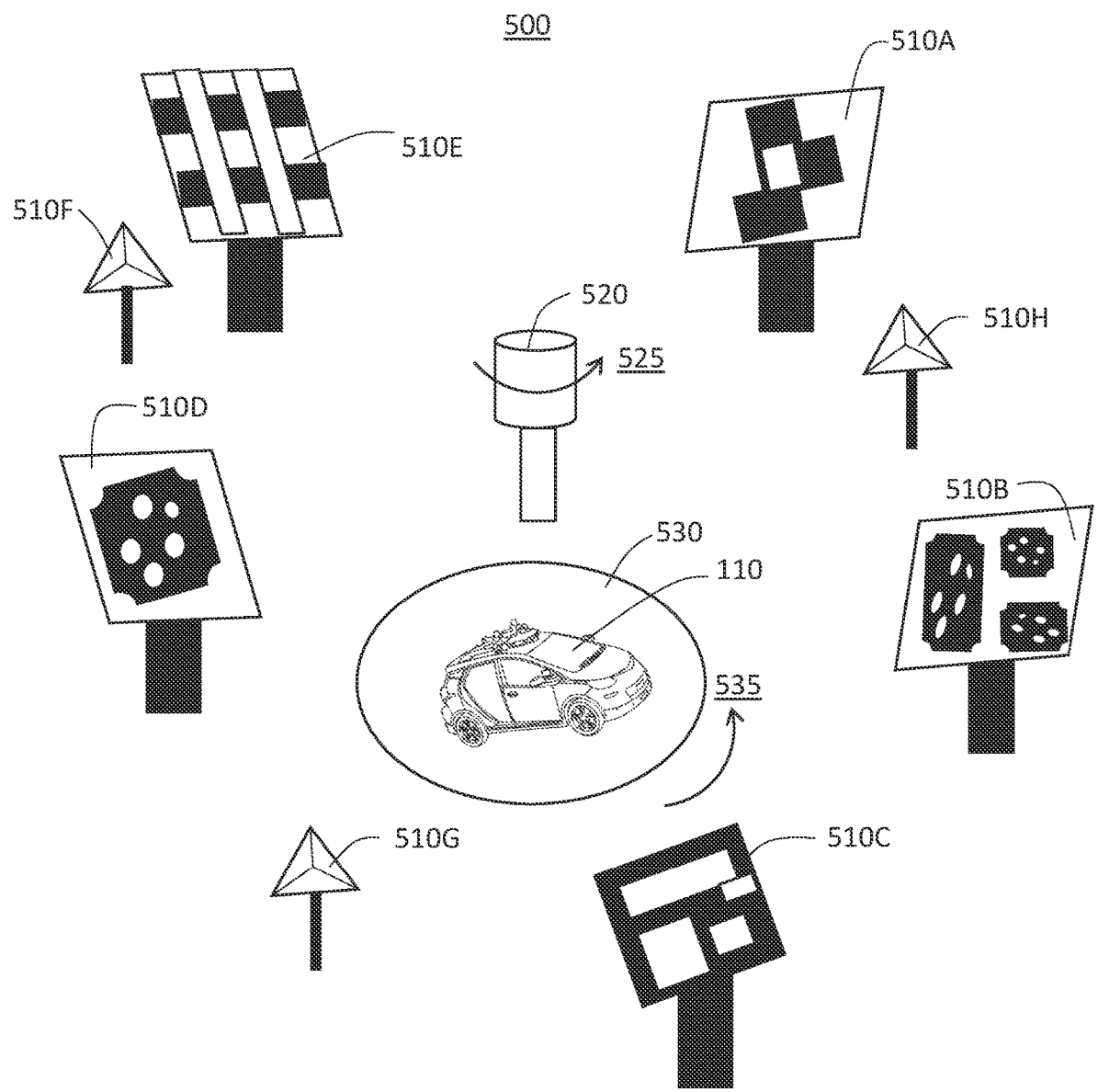
FIG. 5 illustrates an example calibration scene according to some embodiments of the present disclosure.

FIG. 5 illustrates an example calibration scene according to some embodiments of the present disclosure. The calibration scene includes calibration targets 510A-H (collectively referred to as "calibration targets 510" or "calibration target 510"), a detector 520, a turnable station 530.

The calibration targets 510 are reference objects used for calibrating sensors. Each calibration target 510 has one or more features that can be detected by an AV sensor. In FIG. 5, the calibration targets 510A-E have graphical patterns. The features of these calibration targets 510A-E include the edge lines in the graphical patterns. These calibration targets 510A-E can be used to calibration various types of sensors, such as cameras, LIDAR, etc. The calibration targets 510F-H have a triangle shape and include reflective surfaces and corners in the middle of the triangle shape. These calibration targets 510F-H can be used to calibration RADAR. In other embodiments, the calibration scene may include other types of calibration targets. The calibration targets 510 are located at different positions in the calibration scene and may have different orientations from each other.

The detector 520 scans the calibration scene to generate scene data that captures features of the calibration targets 510. An embodiment of the detector spins around to scan the whole calibration scene, as shown by the arrow 525 in FIG. 5. FIG. 5 shows that the detector spins anticlockwise. In other embodiments, the detector may spin clockwise or both clockwise and anticlockwise. The detector may generate scene data at a predetermined frequency, e.g., a frequency of the detector finishing a full scan of the calibration scene. A full scan of the calibration scene is a scan of all the calibration targets in the calibration scene by the detector. The detector may spin 360° in a full scan. Alternatively, the detector may spin less or more than 360°. In some embodiments, the detector outputs a new set of scene data after it finishes each scan of the calibration scene. The detector periodically sends scene data to a different system, e.g., the online server 120, for calibrating AV sensors. The detector may send scene data to the online server 120 every time it generates a new set of scene data. The detector 520 may be regularly calibrated to ensure that the detection by the detector is accurate.

The turnable station 530 provides a space for the AV 110 under calibration. The turnable station 530 rotates on the ground of the calibration scene during the sensor calibration process to spin the AV 110 around the calibration scene or part of the calibration scene. The turnable station 530 may rotate at a same speed and in the same direction as the detector, so that the detection of the calibration targets 510 by the detector 520 can be comparable to the detector of the calibration targets 510 by the AV sensor under calibration. As indicated by the arrow 535 in FIG. 5, the turnable station 530 rotates anticlockwise. The turnable station 530 may also be capable of rotating clockwise. In some embodiments, the turnable station 530 is arranged close to the detector 520. The turnable station 530 may have a height such that when the AV 110 is on the turnable station 530, the sensor is at the same height as the detectors. The height of the turnable station 530 may be adjustable to accommodate sensors at different positions on the AV 110.

Example Calibration Scene Mapping Process

Figure 6:
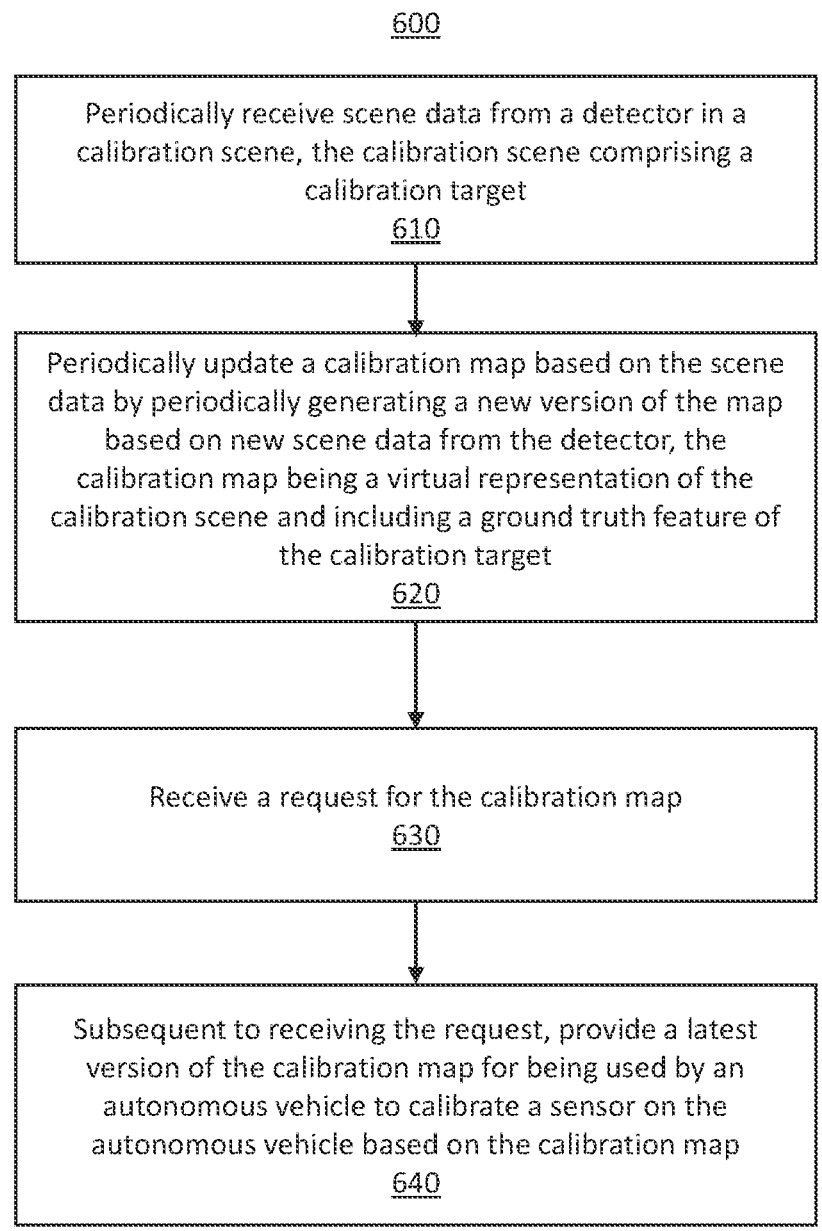
FIG. 6 is a flowchart showing a process of periodically mapping a calibration scene according to some embodiments of the present disclosure.

FIG. 6 is a flowchart showing a process 600 of periodically mapping a calibration scene according to some embodiments of the present disclosure. The process 600 may be performed by the sensor calibration system 230. Although the process 600 is described with reference to the flowchart illustrated in FIG. 6, many other processes of calibrating sensors of AVs may alternatively be used. For example, the order of execution of the steps in FIG. 6 may be changed. As another example, some of the steps may be changed, eliminated, or combined.

The sensor calibration system 230 periodically receives, in 610, scene data from a detector in a calibration scene. The calibration scene includes a calibration target. The calibration target is a reference object used for calibrating a sensor of an AV 110. The sensor calibration system 230 may receive a new set of scene data every time the detector finishes a scan of the calibration scene and outputs the new set of scene data. The scene data includes a point cloud including a plurality of points. At least some of the points represent features of the calibration target. The features of the calibration target may be a pose of the calibration target, edge lines in the calibration target, structures in the calibration target, other types of features, or some combination thereof. Additionally or alternatively, the scene data includes one or more images of the calibration scene.

The sensor calibration system 230 periodically updates, in 620, a calibration map based on the scene data by periodically generating a new version of the calibration map based on new scene data from the detector. The calibration map is a virtual representation of the calibration scene. The calibration map may be two-dimensional or three-dimensional. The calibration map includes features of the calibration target that are used as ground truth features for calibrating the sensor. The sensor calibration system 230 may update the calibration map at a predetermined frequency. The predetermined frequency may be a frequency of the detector completing a full scan of the calibration scene.

The sensor calibration system 230 receives, in 630, a request for the calibration map. The sensor calibration system 230 may receive the request from an AV 110. The AV 110 includes one or more sensor that need to be calibrated. Alternatively, the sensor calibration system 230 may receive the request from a third-party system involving in calibrating AV sensors, such as the online server 120 in embodiments where the sensor calibration system 230 is separate from the online server 120.

Subsequent to receiving the request, the sensor calibration system 230 provides, in 640, a latest version of the calibration map for being used by an AV 110 to calibrate a sensor on the AV 110 based on the calibration map. In embodiments where the request is from the AV 110, the sensor calibration system 230 can send the calibration map to the AV 110. In embodiments where the sensor calibration system 230 receives the request from the online server 120, the sensor calibration system 230 sends the calibration map to the online server 120 and the online server 120 provides the calibration map to the AV 110. The AV 110 is configured to use the calibration map to calibrate a sensor on the AV 110. For instance, the AV 110 uses the calibration map to find the ground truth features of the calibration target and compare the ground truth features with features of the calibration target detected by the sensor. The AV 110 may adjust a pose or internal parameters of the sensor based on the comparison to improve the sensor's accuracy in detecting environments surrounding the AV 110.

In some embodiments, subsequent to receiving the request, the sensor calibration system 230 determines whether the calibration scene is ready for the AV 110 based on the latest version of the calibration map. For instance, the sensor calibration system 230 detects objects other than the calibration targets in the calibration scene based on the latest version of the calibration map. In an embodiment where the sensor calibration system 230 detectors a foreign object, e.g., a person, present in the calibration scene, the sensor calibration system 230 determines that the calibration scene is not ready and may instruct the AV 110 to hold off on calibrating the sensor. The sensor calibration system 230 may also detect whether the calibration target is at a predetermined location based on the latest version of the calibration map. In embodiments where the sensor calibration system 230 determines that the calibration target of the calibration targets is not at the predetermined location, the sensor calibration system 230 determines that the calibration scene is not ready for the autonomous vehicle. the sensor calibration system 230 may move the calibration target to the predetermined location and then determine that the calibration scene is ready. In embodiments where the sensor calibration system 230 determines that the calibration scene is ready for the AV 110, the sensor calibration system 230 transmits the latest version of the calibration map to the AV 110.

The latest version of the calibration map includes one or more updates made by the sensor calibration system 230 to the calibration map by the time the request was received from the AV 110. In some embodiments, the sensor calibration system 230 may receive a new set of scene data from the detector after it sends the calibration map to the AV 110. In such cases, the sensor calibration system 230 may generate a newer version of the calibration map and send the newer version to the AV 110.

In some embodiments, the sensor calibration system 230 controls the AV 110. For instance, the sensor calibration system 230 instructs the AV 110 to navigate to a predetermined location (e.g., a turnable station) inside the calibration scene. At the predetermined location, a distance of the sensor from a ground of the calibration scene is the same as a distance of the detector from the ground of the calibration scene. The sensor calibration system 230 may also cause the AV 110 to spin at the predetermined location by either rotating a turnable station or instructing the AV 110 to spin by itself.

SELECT EXAMPLES

Example 1 provides a method for periodically mapping a calibration scene, the method including periodically receiving scene data from a detector in the calibration scene, the calibration scene comprising a calibration target; periodically updating a calibration map based on the scene data by periodically generating a new version of the calibration map based on new scene data from the detector, the calibration map being a virtual representation of the calibration scene and including a ground truth feature of the calibration target; receiving a request for the calibration map; and subsequent to receiving the request, providing a latest version of the calibration map for being used by an autonomous vehicle to calibrate a sensor on the autonomous vehicle based on the calibration map.

Example 2 provides the method of example 1, where periodically updating the calibration map includes updating the calibration map at a predetermined frequency.

Example 3 provides the method of example 2, where the predetermined frequency is a frequency of the detector completing a full scan of the calibration scene.

Example 4 provides the method of example 1, where the scene data comprises a point cloud including a plurality of points, at least some of the points representing features of the calibration targets.

Example 5 provides the method of example 4, where the features of the calibration target comprise edge lines in the calibration targets.

Example 6 provides the method of example 1, where the scene data comprises one or more images of the calibration scene.

Example 7 provides the method of example 1, where subsequent to receiving the request, transmitting the latest version of the calibration map includes determining whether the calibration scene is ready for the autonomous vehicle based on the latest version of the calibration map; and in response to determining that the calibration scene is ready for the autonomous vehicle, transmitting the latest version of the calibration map to the autonomous vehicle.

Example 8 provides the method of example 7, where determining whether the calibration scene is ready for the autonomous vehicle includes detecting objects other than the calibration target in the calibration scene based on the latest version of the calibration map.

Example 9 provides the method of example 7, where determining whether the calibration scene is ready for the autonomous vehicle includes detecting whether a person is present in the calibration scene based on the latest version of the calibration map; and in response to determining that a person is present in the calibration scene, determining that the calibration scene is not ready for the autonomous vehicle.

Example 10 provides the method of example 7, where determining whether the calibration scene is ready for the autonomous vehicle includes detecting whether the calibration target is at a predetermined location based on the latest version of the calibration map; and in response to determining that the calibration target of the calibration targets is not at the predetermined location, determining that the calibration scene is not ready for the autonomous vehicle.

Example 11 provides the method of example 10, further including in response to determining that the calibration target is not at the predetermined location, moving the calibration target to the predetermined location.

Example 12 provides the method of example 1, further includes instructing the autonomous vehicle to navigate to a predetermined location inside the calibration scene.

Example 13 provides the method of example 12, further includes causing the autonomous vehicle to spin at the predetermined location.

Example 14 provides the method of example 1, where a distance of the sensor from a ground of the calibration scene is equal to a distance of the detector from the ground of the calibration scene.

Example 15 provides the method of example 1, further includes subsequent to transmitting the latest version of the calibration map to the autonomous vehicle, receiving additional scene data from the detector; generating an additional version of the calibration map based on the additional scene data; and transmitting the additional version of the calibration map to the autonomous vehicle.

Example 16 provides one or more non-transitory computer-readable media storing instructions executable to perform operations for periodically mapping a calibration scene, the operations including periodically receiving scene data from a detector in the calibration scene, the calibration scene comprising a calibration target; periodically updating a calibration map based on the scene data by periodically generating a new version of the calibration map based on new scene data from the detector, the calibration map being a virtual representation of the calibration scene and including a ground truth feature of the calibration target; receiving a request for the calibration map; and subsequent to receiving the request, providing a latest version of the calibration map for being used by an autonomous vehicle to calibrate a sensor on the autonomous vehicle based on the calibration map.

Example 17 provides the one or more non-transitory computer-readable media of example 16, where periodically updating the virtual representation of the calibration scene includes updating the virtual representation of the calibration scene at a predetermined frequency.

Example 18 provides the one or more non-transitory computer-readable media of example 16, where the scene data comprises a point cloud including a plurality of points or an image of the calibration scene.

Example 19 provides the one or more non-transitory computer-readable media of example 16, where subsequent to receiving the request, transmitting the latest version of the calibration map to the autonomous vehicle includes determining whether the calibration scene is ready for the autonomous vehicle based on the latest version of the calibration map; and in response to determining that the calibration scene is ready for the autonomous vehicle, transmitting the latest version of the calibration map to the autonomous vehicle.

Example 20 provides a computer system for periodically mapping a calibration scene, the computer system including a computer processor for executing computer program instructions; and one or more non-transitory computer-readable media storing computer program instructions executable by the computer processor to perform operations including periodically receiving scene data from a detector in the calibration scene, the calibration scene comprising a calibration target; periodically updating a calibration map based on the scene data by periodically generating a new version of the calibration map based on new scene data from the detector, the calibration map being a virtual representation of the calibration scene and including a ground truth feature of the calibration target; receiving a request for the calibration map; and subsequent to receiving the request, providing a latest version of the calibration map for being used by an autonomous vehicle to calibrate a sensor on the autonomous vehicle based on the calibration map.

OTHER IMPLEMENTATION NOTES, VARIATIONS, AND APPLICATIONS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the figures may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

What is claimed is:

1. A method for periodically mapping a calibration scene, the method comprising:
   periodically receiving, by a sensor calibration system, scene data from a detector in the calibration scene, the calibration scene comprising a calibration target for calibrating a sensor on an autonomous vehicle, the detector separate from the autonomous vehicle;
   periodically updating, by the sensor calibration system, a calibration map based on the scene data by periodically generating a new version of the calibration map based on new scene data from the detector, the calibration map being a virtual representation of the calibration scene and including a ground truth feature of the calibration target;
   receiving, by a sensor calibration system form the autonomous vehicle, a request for the calibration map; and
   subsequent to receiving the request, providing, by a sensor calibration system, a latest version of the calibration map for being used by the autonomous vehicle to calibrate the sensor on the autonomous vehicle based on the calibration map.

2. The method of claim 1, wherein periodically updating the calibration map comprises:
   updating the calibration map at a predetermined frequency.

3. The method of claim 2, wherein the predetermined frequency is a frequency of the detector completing a full scan of the calibration scene.

4. The method of claim 1, wherein the scene data comprises a point cloud including a plurality of points, at least some of the points representing features of the calibration target.

5. The method of claim 4, wherein the features of the calibration target comprise edge lines in the calibration target.

6. The method of claim 1, wherein the scene data comprises one or more images of the calibration scene.

7. The method of claim 1, wherein subsequent to receiving the request, providing the latest version of the calibration map comprises:
   determining whether the calibration scene is ready for the autonomous vehicle based on the latest version of the calibration map; and
   in response to determining that the calibration scene is ready for the autonomous vehicle, providing the latest version of the calibration map to the autonomous vehicle.

8. The method of claim 7, wherein determining whether the calibration scene is ready for the autonomous vehicle comprises:
   detecting objects other than the calibration target in the calibration scene based on the latest version of the calibration map.

9. The method of claim 7, wherein determining whether the calibration scene is ready for the autonomous vehicle comprises:
   detecting whether a person is present in the calibration scene based on the latest version of the calibration map; and
   in response to determining that a person is present in the calibration scene, determining that the calibration scene is not ready for the autonomous vehicle.

10. The method of claim 7, wherein determining whether the calibration scene is ready for the autonomous vehicle comprises:
    detecting whether the calibration target is at a predetermined location based on the latest version of the calibration map; and
    in response to determining that the calibration target is not at the predetermined location, determining that the calibration scene is not ready for the autonomous vehicle.

11. The method of claim 10, further comprising:
    in response to determining that the calibration target is not at the predetermined location, moving the calibration target to the predetermined location.

12. The method of claim 1, further comprises:
    instructing the autonomous vehicle to navigate to a predetermined location inside the calibration scene.

13. The method of claim 12, further comprises:
    causing the autonomous vehicle to move relative to the calibration target.

14. The method of claim 1, wherein a distance of the sensor from a ground of the calibration scene is equal to a distance of the detector from the ground of the calibration scene.

15. The method of claim 1, further comprises:
    subsequent to providing the latest version of the calibration map to the autonomous vehicle, receiving additional scene data from the detector;
    generating an additional version of the calibration map based on the additional scene data; and
    providing the additional version of the calibration map to the autonomous vehicle.

16. One or more non-transitory computer-readable media storing instructions executable to perform operations for periodically mapping a calibration scene, the operations comprising:
    periodically receiving, by a sensor calibration system, scene data from a detector in the calibration scene, the calibration scene comprising a calibration target for calibrating a sensor on an autonomous vehicle, the detector separate from the autonomous vehicle;
    periodically updating, by the sensor calibration system, a calibration map based on the scene data by periodically generating a new version of the calibration map based on new scene data from the detector, the calibration map being a virtual representation of the calibration scene and including a ground truth feature of the calibration target;
    receiving, by a sensor calibration system form the autonomous vehicle, a request for the calibration map; and
    subsequent to receiving the request, providing, by a sensor calibration system, a latest version of the calibration map for being used by the autonomous vehicle to calibrate the sensor on the autonomous vehicle based on the calibration map.

17. The one or more non-transitory computer-readable media of claim 16, wherein periodically updating the virtual representation of the calibration scene comprises:
    updating the virtual representation of the calibration scene at a predetermined frequency.

18. The one or more non-transitory computer-readable media of claim 16, wherein the scene data comprises a point cloud including a plurality of points or an image of the calibration scene.

19. The one or more non-transitory computer-readable media of claim 16, wherein subsequent to receiving the request, providing the latest version of the calibration map to the autonomous vehicle comprises:
    determining whether the calibration scene is ready for the autonomous vehicle based on the latest version of the calibration map; and
    in response to determining that the calibration scene is ready for the autonomous vehicle, providing the latest version of the calibration map to the autonomous vehicle.

20. A computer system for periodically mapping a calibration scene, the computer system comprising:
    a computer processor for executing computer program instructions; and
    one or more non-transitory computer-readable media storing computer program instructions executable by the computer processor to perform operations comprising:
        periodically receiving, by a sensor calibration system, scene data from a detector in the calibration scene, the calibration scene comprising a calibration target for calibrating a sensor on an autonomous vehicle, the detector separate from the autonomous vehicle;
        periodically updating, by the sensor calibration system, a calibration map based on the scene data by periodically generating a new version of the calibration map based on new scene data from the detector, the calibration map being a virtual representation of the calibration scene and including a ground truth feature of the calibration target;
        receiving, by a sensor calibration system form the autonomous vehicle, a request for the calibration map; and
        subsequent to receiving the request, providing, by a sensor calibration system, a latest version of the calibration map for being used by the autonomous vehicle to calibrate the sensor on the autonomous vehicle based on the calibration map.

* * * * *